United States Patent
Abdel-Fattah et al.

(10) Patent No.: US 11,807,807 B2
(45) Date of Patent: Nov. 7, 2023

(54) SELECTIVE AND ON-DEMAND NEAR WELLBORE FORMATION PERMEABILITY IMPROVEMENT WITH IN-SITU CAVITATION OF NANOBUBBLES

(71) Applicant: SAUDI ARABIAN OIL COMPANY, Dhahran (SA)

(72) Inventors: Amr I. Abdel-Fattah, Dhahran (SA); Nan Shi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/648,976

(22) Filed: Jan. 26, 2022

(65) Prior Publication Data

US 2023/0235211 A1    Jul. 27, 2023

(51) Int. Cl.
| | |
|---|---|
| C09K 8/518 | (2006.01) |
| C09K 8/506 | (2006.01) |
| E21B 49/08 | (2006.01) |
| E21B 37/00 | (2006.01) |
| C09K 8/504 | (2006.01) |

(52) U.S. Cl.
CPC .............. *C09K 8/518* (2013.01); *C09K 8/506* (2013.01); *C09K 8/5045* (2013.01); *E21B 37/00* (2013.01); *E21B 49/081* (2013.01)

(58) Field of Classification Search
CPC ...... C09K 8/518; C09K 8/5045; C09K 8/506; E21B 37/00; E21B 49/081
See application file for complete search history.

(56) References Cited

U.S. PATENT DOCUMENTS

| | | |
|---|---|---|
| 9,410,405 B2 | 8/2016 | Ayers et al. |
| 10,301,917 B2 | 5/2019 | Nguyen et al. |
| 10,626,321 B2 | 4/2020 | Nguyen et al. |
| 2005/0230107 A1 | 10/2005 | McDaniel et al. |
| 2010/0163227 A1 | 7/2010 | Tranquilla et al. |
| 2013/0126164 A1* | 5/2013 | Sweatman ............ C09K 8/467 166/282 |
| 2013/0146281 A1 | 6/2013 | Noui-Mehidi et al. |
| 2015/0138924 A1 | 5/2015 | Schaefers et al. |
| 2018/0163512 A1* | 6/2018 | Payne .................... C09K 8/516 |
| 2019/0003288 A1 | 1/2019 | Kamler et al. |
| 2019/0093463 A1 | 3/2019 | Hardin et al. |

FOREIGN PATENT DOCUMENTS

| | | |
|---|---|---|
| CN | 111236907 A | 6/2020 |
| GB | 2571338 A | 8/2019 |
| RU | 2266396 C2 * | 12/2005 |
| RU | 2266396 C2 | 12/2005 |

OTHER PUBLICATIONS

Bai, Fushi, et al., "Investigation of Impact Loads Caused by Ultrasonic Cavitation Bubbles in Small Gaps", IEEE Access, vol. 6, Oct. 2018, pp. 64622-64629 (8 pages).

Lee, Eric, "Diffusiophoresis of Liquid Droplets and Gas Bubbles", Chapter 17, Interface Science and Technology, Elsevier Ltd., vol. 26, 2019, pp. 359-384 (26 pages).

Luo, Jing, et al., "Experimental Study on the Impact Characteristics of Cavitation Bubble Collapse on a Wall", Water, MDPI, vol. 10, No. 1262, 2018, pp. 1-13 (13 pages).

Ramaswamy, Krishna, et al., "Targeted microbubbles: a novel application for the treatment of kidney stones", BJU International, vol. 116, No. 1, Jul. 2015, pp. 9-16 (15 pages).

\* cited by examiner

*Primary Examiner* — Kumar R Bhushan
(74) *Attorney, Agent, or Firm* — Osha Bergman Watanabe & Burton LLP

(57) ABSTRACT

A method includes treating a reservoir with a damaged near wellbore region (NWR), including introducing a liquid foam treatment into a wellbore proximate to the damaged NWR, where the liquid foam treatment has a solution medium and nanobubbles, transmitting an acoustic wave towards the damaged NWR such that the nanobubbles collapse, causing fluid flow pathways to form for hydrocarbon production.

A system includes a solution generation tool for generating a liquid foam treatment, where the liquid foam treatment has a solution medium and nanobubbles, where the nanobubbles migrate along a concentration gradient, and an acoustic signal generator transmits an acoustic signal. The system also includes a downhole tool signally coupled to the acoustic signal generator fluidly coupled to the solution generation tool, and the downhole tool transmits an acoustic wave into an NWR and introduces the liquid foam treatment into the wellbore proximate to the NWR.

10 Claims, 12 Drawing Sheets

SELECTIVE AND ON-DEMAND NEAR WELLBORE FORMATION PERMEABILITY IMPROVEMENT WITH IN-SITU CAVITATION OF NANOBUBBLES

BACKGROUND

Hydrocarbon resources, including oil and gas, are typically located below the surface of the earth in subterranean porous rock formations. To access these resources, wells are drilled to extract the hydrocarbon fluids from the reservoir. However, drilling may also damage the formation physically or chemically due to the interaction between the drill bit, a reamer, or the drilling fluid and the rocks and minerals in the formation. For example, mud filtrate within the drilling mud may deposit on the face of the wellbore, forming a layer (termed "filter cake" or "mud cake") adhered to the wellbore wall. Additionally, the pores of the subterranean formation near the wellbore may be impacted by pore plugging (that is, formation damage) resulting from fines or filtrate invasion either through transport phenomenon or by being mechanically forced into the pores. Such damage mainly occurs at the interface between the wellbore and the reservoir, called the "near wellbore region" (NWR), or it may proceed deeper within.

Hydrocarbon production traditionally may be stimulated by removing the formation damage elements to the NWR by applying a chemical (for example, acids) or by utilizing a mechanical solution. Such remediation may allow hydrocarbons from the reservoir to traverse through the NWR and into the wellbore.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed herein relate to a method for treating a reservoir with a damaged near wellbore region (NWR), the method including introducing a liquid foam treatment into a wellbore proximate to the damaged NWR, where the liquid foam treatment has a solution medium and nanobubbles, where the nanobubbles are configured to migrate from a lean medium in the wellbore to a rich medium in the NWR using a concentration gradient, and where the introduction of the liquid foam treatment into the wellbore promotes formation of the concentration gradient. The method also relates to maintaining the wellbore such that at least a portion of the nanobubbles migrate into the damaged NWR from the wellbore. The method also relates to transmitting an acoustic wave towards the damaged NWR such that the nanobubbles affected by the transmission in the wellbore and in the damaged NWR collapse, causing fluid flow pathways to form through the damaged NWR, where the formed fluid flow pathways provide fluid connectivity between the wellbore and the reservoir sufficient for hydrocarbon production.

In one aspect, embodiments disclosed herein relate to a system for treating a subterranean formation, the system including a solution generation tool for generating a liquid foam treatment, where the liquid foam treatment has a solution medium and nanobubbles, where the nanobubbles migrate along a concentration gradient, and an acoustic signal generator transmits an acoustic signal. The system also relates to a downhole tool signally coupled to the acoustic signal generator fluidly coupled to the solution generation tool, where the downhole tool transmits an acoustic wave into a near wellbore region (NWR) of a reservoir and introduces the liquid foam treatment into the wellbore proximate to the NWR.

Other aspects and advantages of the claimed subject matter will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described. The use of the prime or "'" mark with a numeral may indicate a like element in a different state of operation or condition than previously referenced; however, other aspects remain the same.

Figure 1:
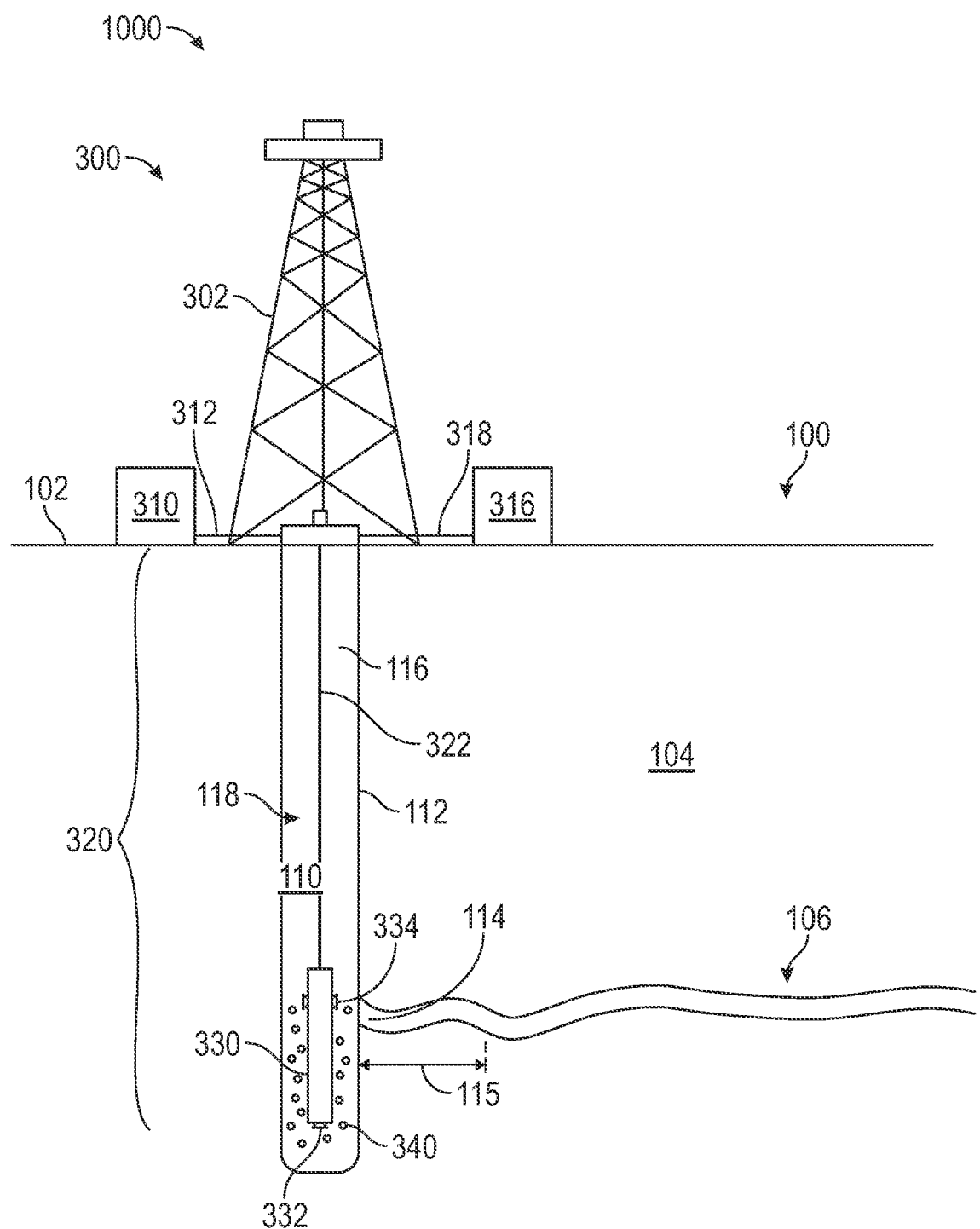
FIG. 1 depicts a well system for treating the near wellbore region of a reservoir according to one or more embodiments.

Typically, down is toward or at the bottom and up is toward or at the top of the figure. "Up" and "down" are oriented relative to a local vertical direction. However, in the oil and gas industry, one or more activity takes place in a vertical, substantially vertical, deviated, substantially horizontal, or horizontal well. Therefore, one or more figure may represent an activity in deviated or horizontal wellbore configuration. "Uphole" may refer to objects, units, or processes that are positioned relatively closer to the surface entry in a wellbore than another. "Downhole" may refer to objects, units, or processes that are positioned relatively farther from the surface entry in a wellbore than another.

DETAILED DESCRIPTION

A problem with using a strong acid on a reservoir is that any mud cake or wellbore damage removal may be non-uniform due to differences in the composition or thicknesses, leaving portions of the NWR with fluid blockages. Another issue is that strong acids tend to instantaneously react with subterranean formation material upon contact due to the amount of acid-reactive material present and the strength of the acid. This results in almost immediate depletion of the strong acid, resulting in the creation of wide yet shallow (that is, not penetrating deep into the subterranean formation relative to the distance from the wellbore) and non-uniform wormholes through the subterranean formation. These shallow-depth wormholes are not as desirable as deep fluid pathways through the reservoir that would function as conduits for hydrocarbon fluid flow into the wellbore. Such fluid pathways enhance the rate and efficiency of hydrocarbon extraction from the reservoir.

The near wellbore region (NWR), which is an interfacial region between the wellbore wall and the subterranean formation, is frequently altered during well drilling, for example, by pore infiltration and mud cake buildup. The NWR may have a thickness that is determined by the distance between the wellbore wall into a given distance into the interior of the reservoir from the wellbore. In one or more embodiments, the NWR may have a thickness in a range of from about 1 millimeter (mm) to 10 meters (m) thick.

One or more embodiments may be directed to methods and systems to displace, break, or loosen unwanted debris present in the NWR that is generated during drilling activities and that may remain after post-drilling treatments, including acidification. Unwanted formation damage elements also include precipitates from the oil or water phases. Specifically, one or more embodiments may treat the NWR by purposeful migration of nanometer-scale gas bubbles into the NWR. Following introduction of the nanobubbles into the NWR, the nanobubbles are energized such that they collapse within the NWR, disrupting damage and creating fluid flow pathways.

One or more embodiments may increase the diffusiophoretic velocity of the nanobubbles into the NWR versus what may occur naturally by introducing nanobubbles into a wellbore proximate to the NWR of a reservoir. Examples may include forming an ion concentration gradient between the fluid in the wellbore and the fluid in the reservoir such that the nanobubbles migrate into the NWR. Examples may also include forming an organic concentration gradient between the fluid in the wellbore and the fluid in the reservoir such that the nanobubbles migrate into the NWR. Another example may include surface functionalization of the nanobubbles, where the surface functionalization enhances the rate of diffusiophoretic velocity along the concentration gradient into the NWR.

In one or more embodiments, a portion of a NWR may be selectively treated while another portion of the same NWR remains untreated. Such a method may permit access to a desired reservoir fluid, such as hydrocarbons, where access to another reservoir fluid, such as formation water, may remain hindered.

"Diffusiophoresis" is defined as the spontaneous migration of a molecule or colloidal particle in a fluid in response to a macroscopic concentration gradient of a different substance in the fluid. Typically, diffusiophoresis describes the movement of a larger mobile species (that is, particles in the nano or micron diameter range, for example, nanobubbles) in response to a concentration gradient of a much smaller species (for example, disassociated ions from a dissolved salt, such as monatomic cations) in solution, such as water. In one or more embodiments, a liquid foam treatment may be configured to manipulate the concentration gradient, which may affect the diffusiophoretic velocity of nanobubbles, between the ionic- or organic-lean fluid in the wellbore outside of a NWR and the fluid present inside the reservoir, such as the NWR.

In one or more embodiments, the exterior surface of the nanobubbles may be configured to facilitate diffusiophoresis, such as by chemical functionalization.

"Cavitation" is the generation and energetic failure of gas- or vapor-filled voids within a liquid. Small vapor-filled bubbles may be formed when the pressure of a liquid is less than the vapor pressure of the liquid. These bubbles, once formed, may collapse when subjected to a greater pressure. The collapse of bubbles occurs when the pressure exceeds the vapor pressure of the bubble. An acoustic wave may provide this temporary pressure increase to induce bubble collapse. The bubbles may be initially generated at wellhead conditions and conveyed downhole.

The collapse of such bubbles may cause a high energy shock wave that further forms a fluidic microjet. The resultant microjets from the cavitation of bubbles may have a speed of about 100 meters per second (m/s). Such speed in micro-sized fluid jets may lead to impact pressures on nearby solid surfaces of up to about 50 megapascals (MPa). The fluidic microjets may be utilized in one or more embodiments to dislodge or destroy debris in the NWR and clear a fluid path between the wellbore and the reservoir. Fluid connectivity between the reservoir and the wellbore would permit activities such as hydrocarbon production and reservoir treatment.

The embodiment methods and systems may effectively remedy drilling damage by remediating the NWR. Using diffusiophoresis prior to nanobubble cavitation may permit a deeper and more even treatment of the NWR than merely introducing nanobubbles to the front of a NWR and transmitting acoustic waves, which may merely affect the wellbore face of the NWR.

The liquid foam treatment and the gases utilized to generate the nanobubbles may utilize chemically inert, non-toxic, and, if desired, non-flammable materials. Utilizing nanobubbles as the stimulating agent may provide a means for debris removal from the NWR that does not require the use of strong acids or other materials that may harm personnel or downhole equipment, or even require on-site specialized storage and training to use.

The treatment utilizing nanobubbles does not require chemical flowback from the reservoir to remove either unspent acid or reaction byproducts. Matrix acidification byproducts of reservoir materials are known to generate insoluble byproducts that may in and of themselves damage the NWR. Rather, the cavitation of the bubbles in the NWR may result in destroying or mitigating debris that interferes with flow while not creating insoluble byproducts.

The one or more embodiments may be utilized to selectively target specific the near wellbore region of the reservoir. It may be desirable to retain mud cake or other wellbore fluid residue on a portion of the reservoir face to restrict fluid access between the wellbore and the various formations in the subsurface. Nanobubbles in the wellbore that do not move into the NWR by diffusiophoresis and are not collapsed merely float uphole; they do not chemically interact with anything. Other treatments, such as acids, may inadvertently flow to other areas of the wellbore during treatment and damage equipment or sensitive formations.

FIG. 1 depicts a well system for treating the near wellbore region of a reservoir according to one or more embodiments. The well system 1000 depicts a geological formation 100 with an associated treatment system 300 mounted on top. The geological formation 100 includes surface 102, which represents the surface of the earth. Surface 102 may be located above water, under water, or under ice. Below surface 102 is the subsurface 104, which may include reservoir 106. Reservoir 106 is a hydrocarbon-bearing formation.

Traversing the subsurface 104 is a wellbore 110. Wellbore 110 is defined by wellbore wall 112. Wellbore 110 traverses through reservoir 106 such that the wellbore 110 is in fluid communication with the near wellbore region (NWR) 115 portion of the reservoir 106 at reservoir face 114. The wellbore 110 is filled with a wellbore fluid 118.

With the associated treatment system 300, a derrick 302 is located on the surface 102 to support a drill string 320 positioned in the wellbore 110. The drill string 320 comprises a drill pipe 322 that runs from the surface 102 downhole in the wellbore 110 that terminates near the reservoir 106 with a coupled downhole tool 330. The drill string 320 and the wellbore wall 112 defines a wellbore annulus 116 along the length of the wellbore 110. Wellbore annulus 116 is the void in the wellbore 110 not occupied by the drill string 320. The wellbore fluid 118 occupies the wellbore annulus 116.

On surface 102, the treatment system 300 includes surface solution bubble generation tool 310, which is configured to generate nanobubbles in the treatment solution utilized for treatment of the NWR 115. Surface solution bubble generation tool 310 is fluidly coupled to downhole tool 330 using liquid foam treatment conduit 312, which is fluidly coupled to downhole tool 330 via drill pipe 322. The nanobubbles 340 are introduced into the wellbore fluid 118 via liquid foam treatment discharge 332 of downhole tool 330.

Treatment system 300 also includes surface acoustic signal generator 316, which generates an acoustic signal for use in treatment of the NWR 115 of reservoir 106. Surface acoustic signal generator 316 is signally coupled to downhole tool 330 using acoustic signal conduit 318, which may run along the interior of drill pipe 322. Transmission of acoustic signals into the NWR 115 originates from an acoustic signal transmitter 334 of downhole tool 330.

Figure 2A:
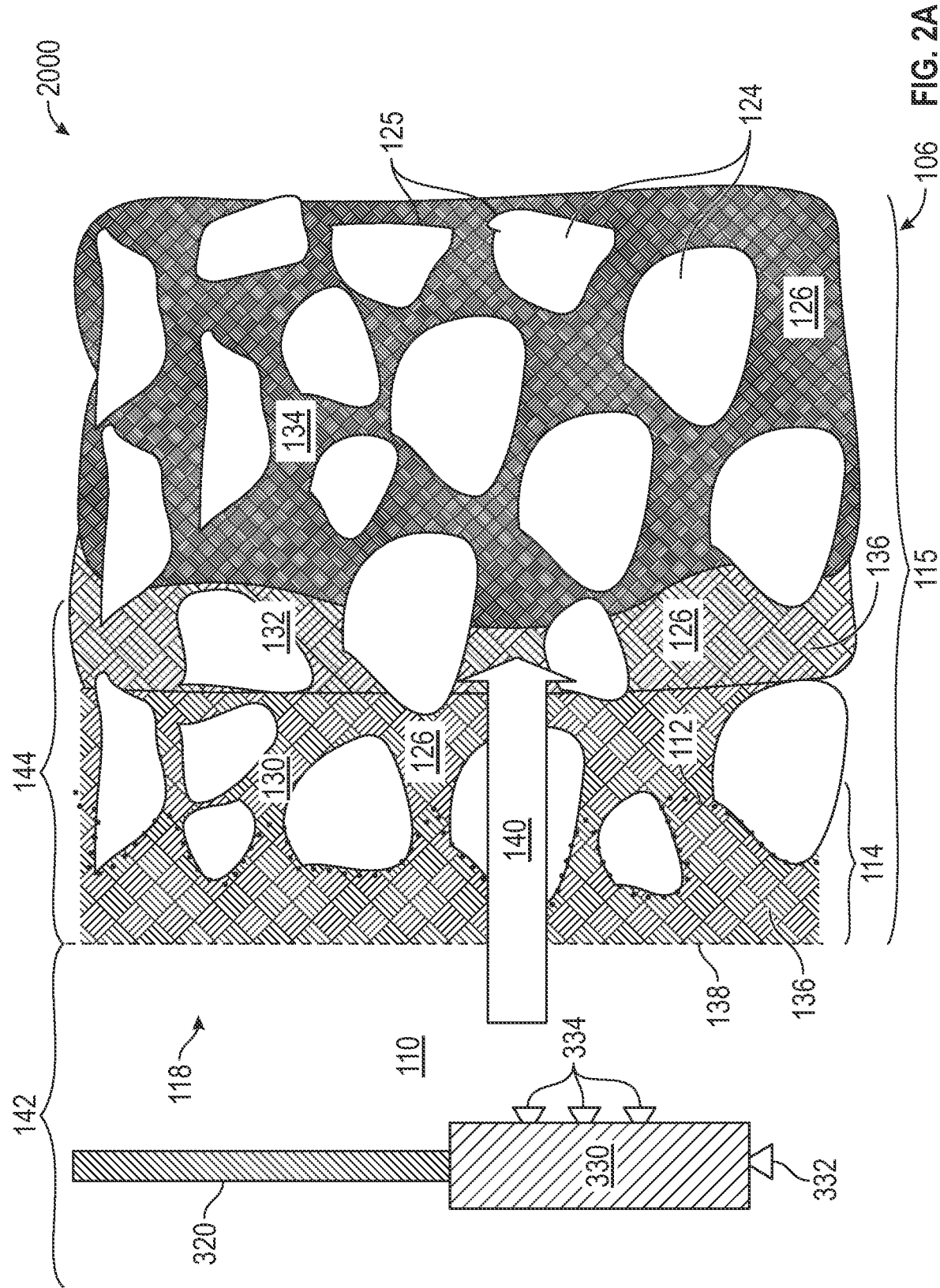
FIGS. 2A-2E depict a sectional view of a portion of a well system during treatment according to one or more embodiments.

FIGS. 2A-2E depict a sectional view of a portion of a well system during treatment according to one or more embodiments. In FIG. 2A, a portion of well system 2000 is shown. Reservoir 106 is shown in fluid communication with the wellbore 110 through NWR 115 at the reservoir face 114. Wellbore wall 112 is shown as an irregular line (thick dashed)—the line reflects the varied and porous nature of the surface at the reservoir face 114. Reservoir 106 is made up of interspersed rock grains 124. The rock grain walls 125 and the distribution of rock grains 124 define voids that form interconnected pores 126 throughout reservoir 106. Through these interconnected pores 126 fluids may traverse between the reservoir 106 and the wellbore 110 via the NWR 115.

Within the NWR 115 there are three general regions of fluids: a region of brine 130, a region of oil and brine emulsion 132, and a region of crude oil 134. Although each region is shown in FIG. 2A with distinct boundaries for discussion purposes, at reservoir conditions these regions are understood to be more diffuse between one another. Still, there is some separation that does occur between the brine and the crude oil, and there is an area of the reservoir where emulsification may occur with certain concentrations of connate brines and hydrocarbons.

Also shown in FIG. 2A is a layer of the reservoir face 114 that contains reservoir damage 136. A portion of the reservoir damage 136 is in fluid contact with the wellbore fluid 118 as an external layer 138, providing a means of fluid or mechanical contact with wellbore 110. The reservoir damage 136 may contain chemical and physical debris, including mud cake, minerals, polymer, lost circulation materials, and heavy hydrocarbons, that generally prevent significant fluid flow from traversing between the wellbore 110 and the remainder of the NWR 115; however, reduced fluid flow, such as diffusion, may still occur. Such debris may comprise very fine, densely packed, and intertwined solid and semi-solid particles (collectively "reservoir damage" 136).

Wellbore 110 is shown with a drill pipe 322 previously introduced. Downhole tool 330 is positioned proximate to the reservoir face 114. Downhole tool 330 is shown with both liquid foam treatment discharge 332 and several acoustic signal transmitters 334, a similar configuration to downhole tool 330 as given in FIG. 1.

Although the discussion for FIGS. 2A-E utilizes ionic materials, one of ordinary skill in the art should realize that many if not all of the aspects of the discussion are equally applicable to the utilization of organic materials.

Regarding the distribution of ions, the wellbore fluid 118 in FIG. 2A represents an ion-lean region 142, whereas the region of brine 130 within reservoir 106 represents an ion-rich region 144. This disparity in ion concentration creates an ion concentration gradient 140 across the NWR 115. The ion concentration gradient 140 is present between the particles of the reservoir damage 136.

Figure 2B:
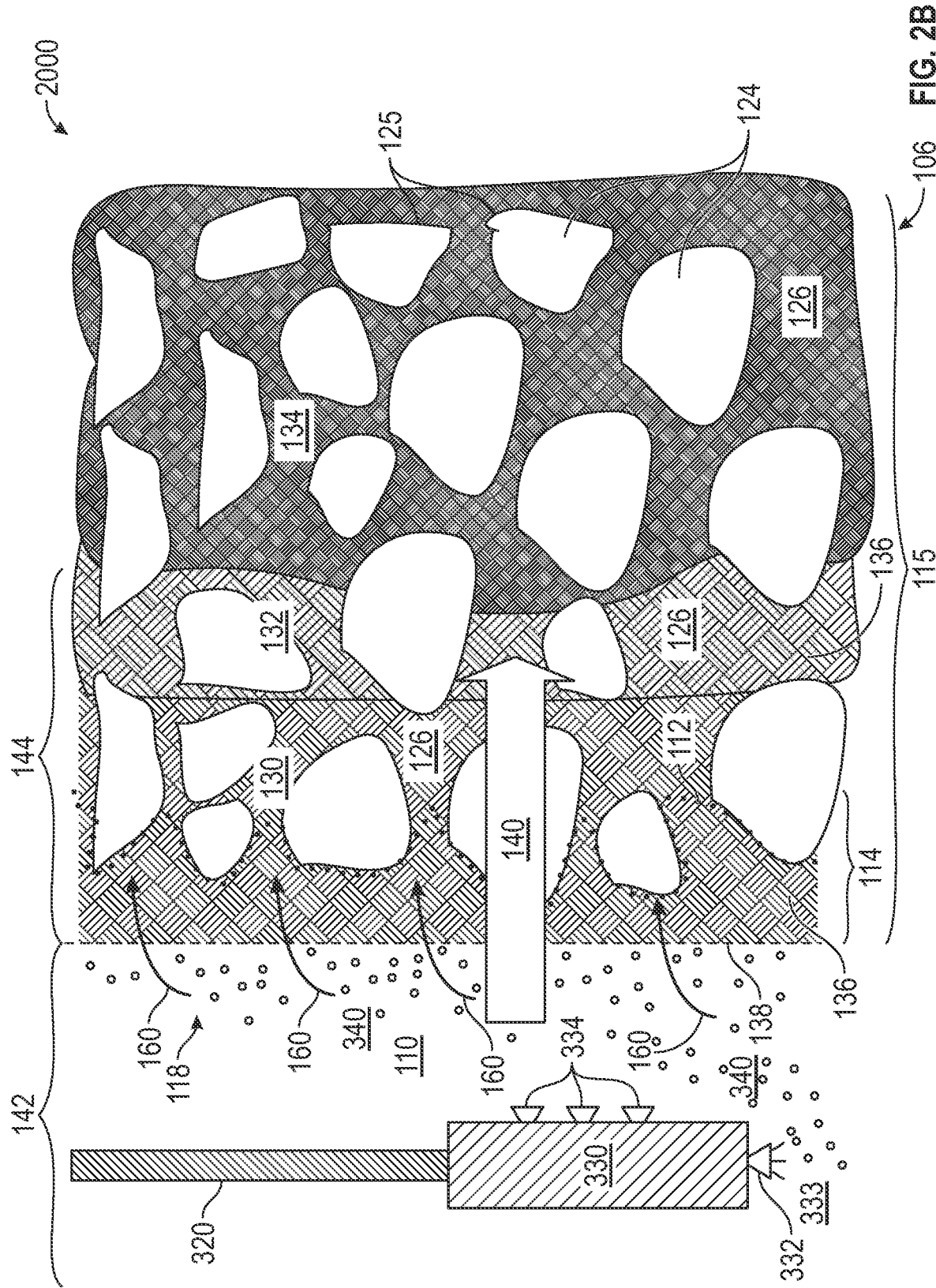

FIG. 2B shows the introduction of the liquid foam treatment into the wellbore. Liquid foam treatment is shown being introduced 333 into wellbore 110 through liquid foam treatment discharge 332 of downhole tool 330. The liquid foam treatment includes an ion-lean medium (not shown) and nanobubbles 340.

The ion-lean medium mixes with the wellbore fluid 118 as it is introduced and disperses. The introduction of the liquid foam treatment may modify the ionic concentration of the wellbore fluid locally as it is introduced. The ion-lean medium mixes with the wellbore fluid proximate to the reservoir face. In one or more embodiments, the mixing alters the composition of an ion concentration of the wellbore fluid proximate to the reservoir face. In one or more embodiments, the ion concentration of a particular ion may be increased; in others, the ion concentration of a particular ion may be decreased. Such manipulation may increase or decrease the ion concentration gradient 140 to facilitate diffusiophoresis of the nanobubbles 340 into the NWR 115.

The ion concentration gradient 140 between the ion-lean region 142 and the ion-rich region 144 in the NWR 115 and the fluids in the reservoir 106, respectively, creates a drive for nanobubbles 340 toward the external layer 138 of the reservoir damage 136. Arrows representing the direction for nanobubble diffusiophoretic migration 160 from the wellbore 110 into the reservoir 106 show the drive of the nanobubbles 340 as they migrate from the ion-lean region 142 into the ion-rich region 144.

The nanobubbles 340 upon introduction into the wellbore fluid 118 tend to migrate in a generally uphole direction due to buoyancy; however, due to their size their migration uphole is gradual. However, due to the ion concentration gradient 140, the same nanobubbles 340 are drawn to the reservoir face 114. As nanobubbles 340 are drawn into the external layer 138, the nanobubbles 340 are motivated to continue to migrate "upgradient" into the greater ion concentration present in the reservoir damage 136 of the NWR 115 (damaged near wellbore region or damaged NWR) using nanobubble diffusiophoretic migration 160.

In one or more embodiments, the nanobubbles may migrate at a diffusiophoretic velocity in a range of from about 0.1 to 10 micrometers per second ($\mu m/s$).

Figure 2C:
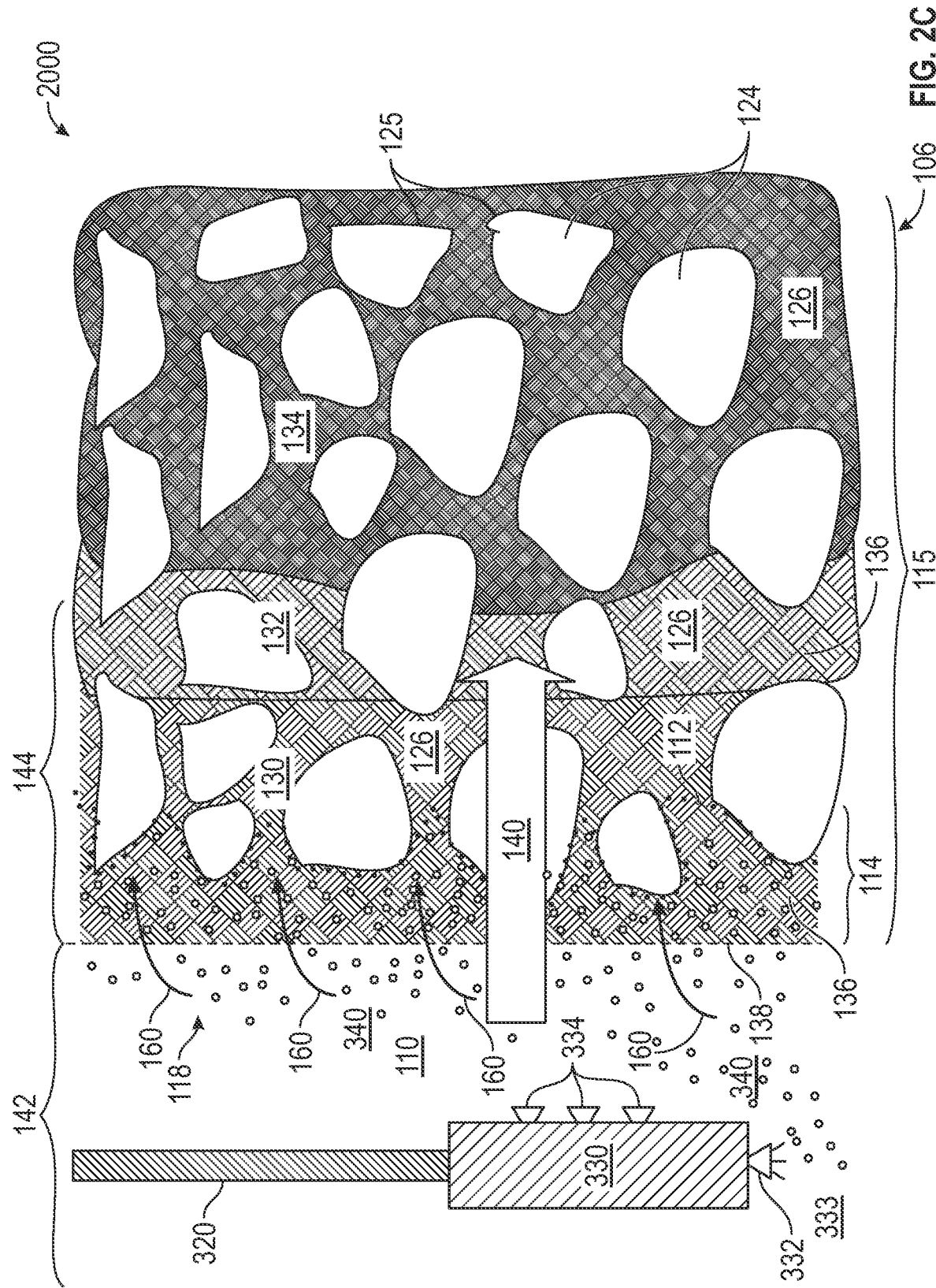

FIG. 2C shows the diffusiophoresis of the nanobubbles into the reservoir face. The concentration of nanobubbles 340 in the reservoir damage 136 area is shown as increased over FIG. 2B. As the nanobubbles 340 continue to move into the NWR 115 up the ion concentration gradient 140 using nanobubble diffusiophoretic migration 160, the nanobubbles 340 encounter the densely-packed area of reservoir damage 136. This densely-packed area slows all fluid movement—gas, liquids—due to the dual-phase slurry of fine solids and fluids. However, as nanobubbles 340 migrate through the reservoir face 114, additional nanobubbles 340 follow from wellbore fluid 118. This slow yet steady movement of nanobubbles 340 creates an increased nanobubble concentration within the reservoir damage 136 area. Eventually some of the nanobubbles 340 break through the reservoir damage 136 and continue traversing deeper into the NWR 115.

In one or more embodiments, the nanobubble migration distance in the near wellbore region of the reservoir may equal the thickness of the reservoir face. In one or more embodiments, the nanobubble migration distance in the near wellbore region of the reservoir may equal the thickness of the near wellbore region of the reservoir. In one or more embodiments, the nanobubble migration distance within the near wellbore region may be in a range of from about 0.1 meter to about 10 meters.

The introduction of liquid foam treatment may occur for a period such that adequate amounts of nanobubbles may aggregate in the NWR. In one or more embodiments, the introduction of liquid foam treatment may occur for a period in a range of from minutes to days depending on the injection rates of the nanobubble solution and permeability of the formation.

Figure 2D:
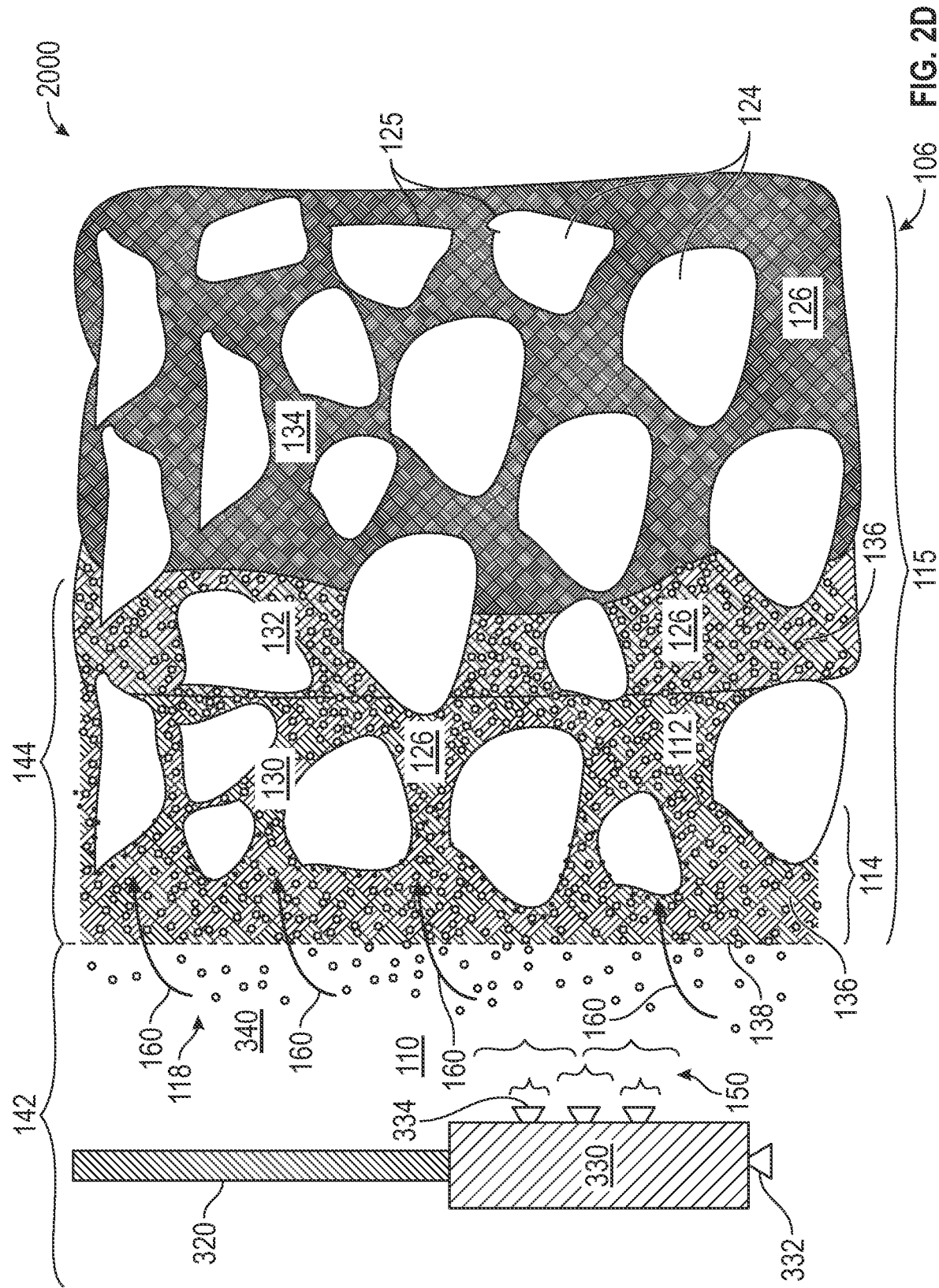

FIG. 2D shows the transmission of an acoustic signal into the wellbore and the NWR. For the sake of clarity, the ion concentration gradient 140 arrow has been removed. The several acoustic signal transmitters 334 on downhole tool 330 are shown starting to transmit acoustic waves 150 through wellbore fluid 118. The concentration of nanobubbles 340 in the NWR 115 has significantly increased over that shown in FIG. 2C. The bubbles have migrated towards a greater concentration portion of the ion concentration gradient through the reservoir damage 136 present in the interconnected pores 126. The nanobubbles 340 have halted in the NWR 115 at the interface between the region of oil and brine emulsion 132 and the region of crude oil 134 because that is the deepest part (and assumingly the greatest ion concentration) of the ion-rich region 144.

FIG. 2D also shows that liquid foam treatment is no longer being introduced into the wellbore 110 through liquid foam treatment discharge 332. In one or more embodiments, the liquid foam treatment may continue to be introduced during the transmission of the acoustic waves.

As discussed previously, the acoustic wave may be transmitted by an acoustic signal transmitter using a transducer that is suitable for downhole service in a wellbore, including in HPHT (high pressure/high temperature) conditions, which are well known by one of ordinary skill in the art.

The characteristics of an acoustic wave (for example, frequency and power density) may be tailored such that the nanobubbles collapse and form fluid microjets that strike the reservoir damage present in the NWR. In one or more embodiments, the acoustic waves transmitted by the acoustic signal transmitter may have a travel range of from about 1 mm (millimeter) to about 10 m (meters).

In one or more embodiments, the acoustic waves transmitted by the acoustic signal transmitter may have a frequency in a range of from at least 1 kilohertz (kHz) to 10 megahertz (MHz).

In one or more embodiments, the acoustic wave transmitted by the acoustic signal transmitter may have a power rating in a range of from about 10 to 1,000 watts (W).

Figure 2E:
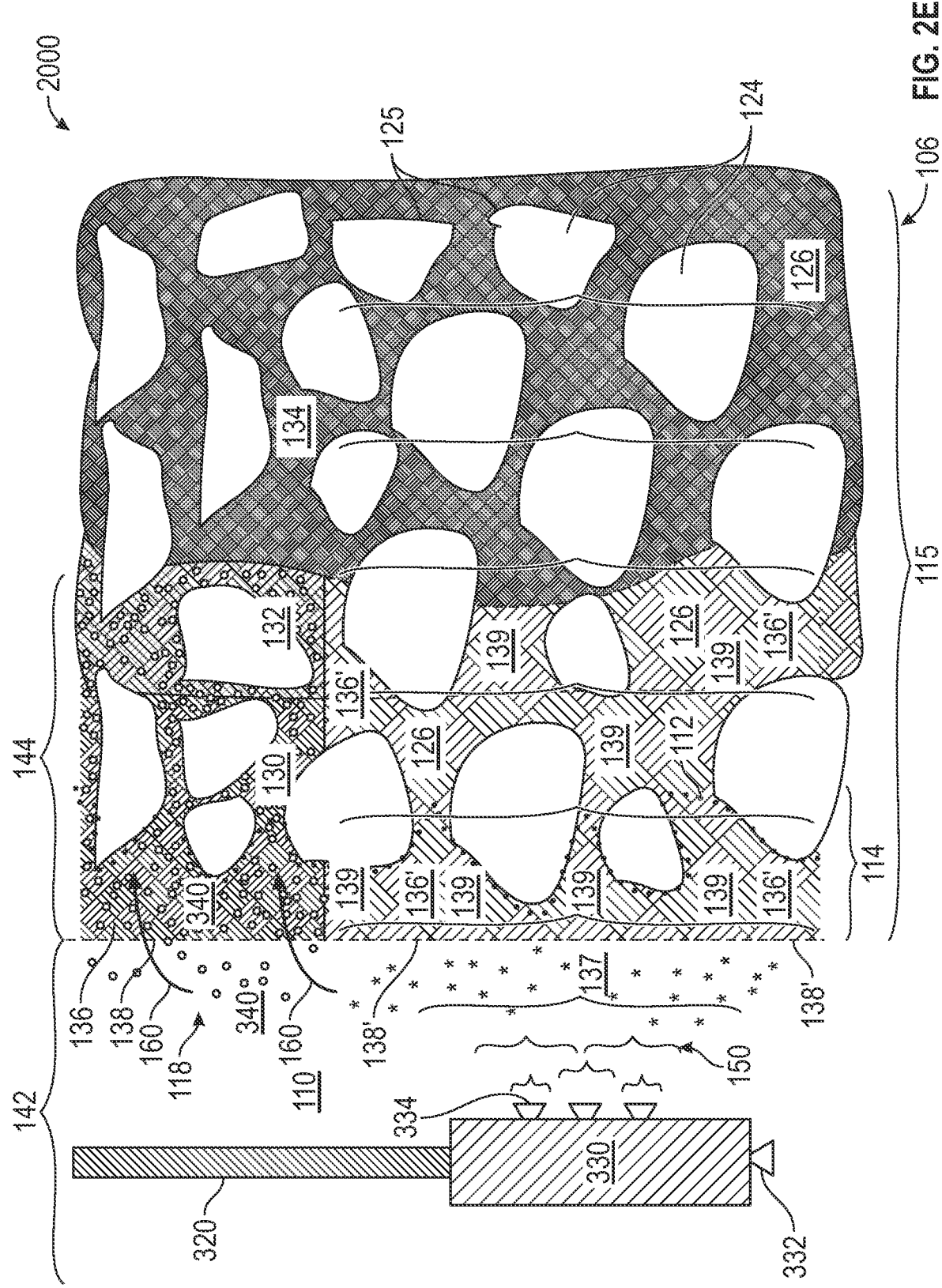

FIG. 2E depicts well system 2000 during treatment but after substantially most of the treatment is complete. When an acoustic wave strikes a nanobubble, a microjet of fluid forms due to the energetic collapse and formation of a shockwave from the collapse. The collapse of the bubble under the wave pressure causes compressed fluid from the collapsed bubble to jet outward. The microjet of fluid flows in the direction of the traversal of the acoustic waves; therefore, the microjets formed are directed approximately perpendicular to the centerline of the wellbore. It is well appreciated that there will be some degree of uphole and downhole variance based upon the angle of the wavefront from the transmitter as it strikes the nanobubble and as the wavefront spreads outwards from the point of transmission.

The acoustic waves 150 traverse through wellbore fluid 118 and into the NWR 115, passing into and through the reservoir damage 136. Sufficient power may be used to ensure that at least a significant portion of the nanobubbles 340 in the NWR 115 are collapsed by the acoustic waves 150 at the interface between the region of oil and brine emulsion 132 and the region of crude oil 134.

As the microjets impact the portions of the reservoir that are slurry-like, that is, combinations of finely packed solids with interspersed liquids, the fine solid materials are either scattered in random directions (assuming the closely-packed materials collide and redistribute force) or are broken down into even finer materials through degradation or disintegration. The fluid microjets may impact nearby surfaces with a force on the order of up to 50 MPa. A series of fluid microjets impacting a closely packed area of consolidated solids or a pore wall of the matrix material may result in a "ricochet effect", where solids rebound from transmitting force into neighboring particles and receiving back similar force from a neighboring particle, causing the particles to "bounce" towards where the waves originated from, that is, generally towards the wellbore.

This jettisoning of debris from the near wellbore region has a two-fold effect. Not only does it form fluid pathways as desired between the wellbore and the reservoir by clearing the NWR of formation damage, but also it introduces debris into the wellbore fluid, where it can be carried uphole to the surface and filtered out. Removing the debris from the wellbore fluid prevents the debris from re-settling and clogging other pores or machinery.

As seen in FIG. 2E, acoustic signal transmitters 334 continue to transmit acoustic waves 150 into the NWR 115. Where the acoustic waves 150 have reached all the nanobubbles have collapsed; no remaining nanobubbles exist, including in the wellbore fluid 118. Where the acoustic waves 150 have not reached nanobubbles 340, reservoir damage 136 is still present (see upper portion of FIG. 2E). This demonstrates the selective nature of the treatment possible with one or more embodiments.

The resultant microfluid jets that formed from the energetic collapse (not shown) eviscerated the reservoir damage almost instantaneously. FIG. 2E shows the remaining reservoir damage 136' throughout the NWR 115 as being discontinuous and disorganized. Clear flow channels 139 may be observed and are defined by a combination of the remaining reservoir damage 136' and the rock grain walls 125 of the rock grains 124. The remaining external layer 138' of the reservoir face 114 is riddled with flow channels 139 defined by the remaining reservoir damage 136'. Fluids may easily traverse the NWR 115 through the flow channels 139 and the interconnected pores 126. Although not wanting to be bound by theory, upon first use some or all of the remaining reservoir damage 136' and the remaining external layer 138' may collapse or be eliminated with any flowback; however, flowback from the reservoir is not required to successfully implement this procedure.

The damage material formerly in the reservoir is shown as having been ejected into the wellbore fluid as debris 137. Such debris, as previously described, may be removed by circulation of the wellbore fluid 118 uphole to surface mud treatment systems (not shown) or be permitted to settle in a rat hole or heel of the wellbore.

FIGS. 3A-3E depict a sectional view of a portion of another well system during treatment according to one or more embodiments. Wellbore wall 512 is shown as an irregular line (thick dashed)—the line reflects the varied and porous nature of the surface at the reservoir face 514. FIGS. 3A-3E depict an embodiment where the driving force for nanobubble migration is an organic concentration gradient as opposed to an ion concentration gradient as previously given in FIGS. 2A-E.

Figure 3A:
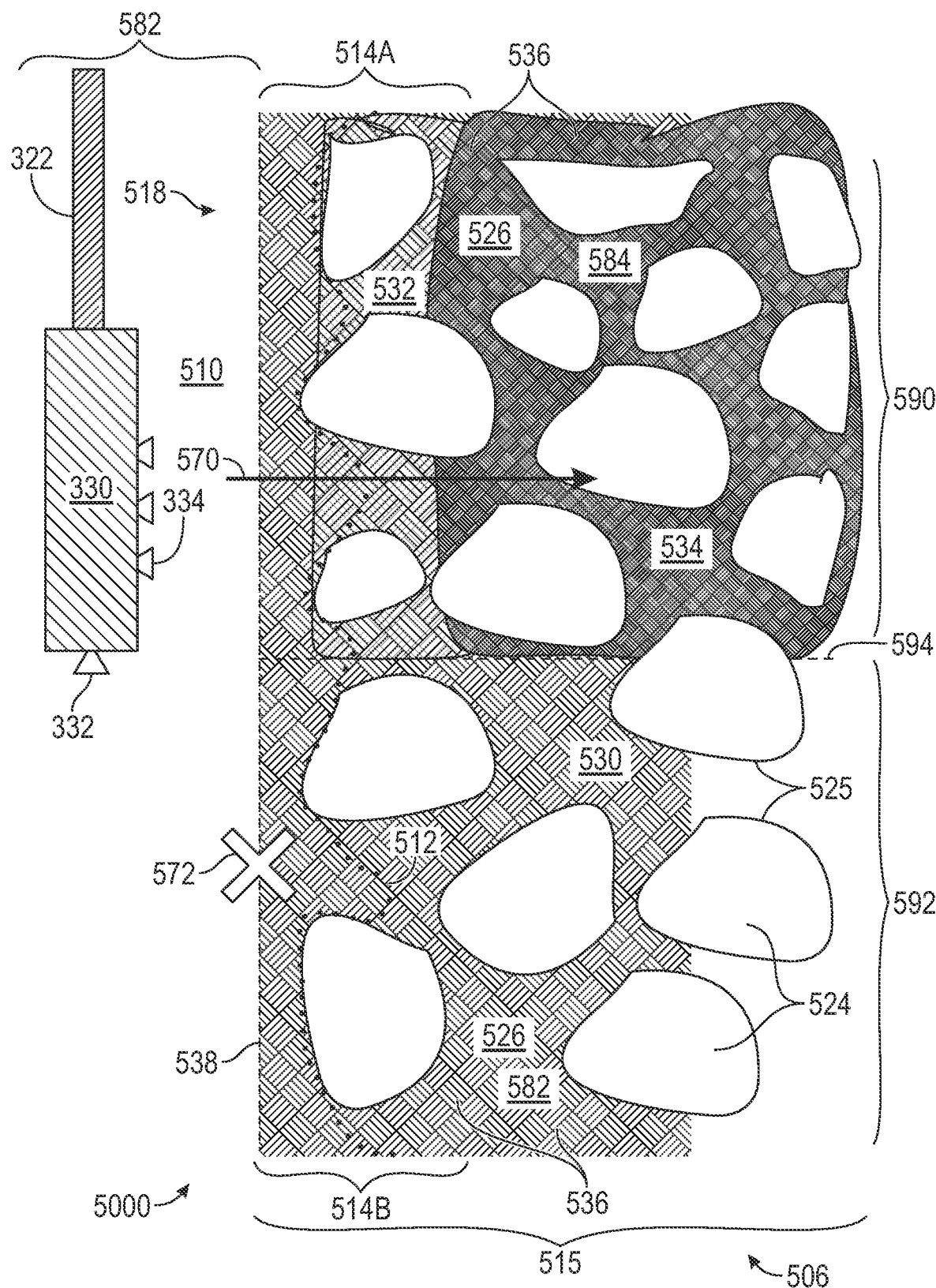
FIGS. 3A-3E depict a sectional view of a portion of another well system during treatment according to one or more embodiments.

In FIG. 3A, a portion of well system 5000 is shown. Well system 5000 is similar in many ways to well system 1000 and well system 2000 as previously described. Reservoir 506 is similar in many characteristics and attributes as reservoir 106 of FIG. 2A. In reservoir 506 there is a difference in the relative position of fluids. In an oil-bearing region 590, located in the upper portion of reservoir 506, it may be observed that a region of oil and brine emulsion 532 and a region of crude oil 534 are present similar to FIG. 2A. In a water-bearing region 592, located in the lower portion of reservoir 506, it may be observed that a region of brine 530 exists. Between the two regions an oil-water interface 594 is present that demarcates the separation between oil-bearing region 590 and water-bearing region 592.

Although the discussion for FIGS. 3A-E utilizes organic materials, one of ordinary skill in the art should realize that many if not all of the aspects of the discussion are equally applicable to the utilization of ionic materials.

Regarding the distribution of organic compounds useful for creating an organic concentration gradient, the wellbore fluid 518 and the water-bearing region 592 in FIG. 3A represents an organic-lean region 582, whereas the oil-bearing region 590 represents an organic-rich region 584. This disparity in organic concentration creates an organic concentration gradient 570 across an upper portion of the reservoir face 514A, whereas an organic concentration gradient does not form in the lower portion of the reservoir face 514B ("×" 572) because of a lack of organic concentration differentiation. Similar to the discussion regarding reservoir 506, the organic concentration gradient 570 is present in the reservoir fluid present between the particles of the reservoir damage 536 in oil-bearing region 590 but not the reservoir damage 536 of water-bearing region 592.

Figure 3B:
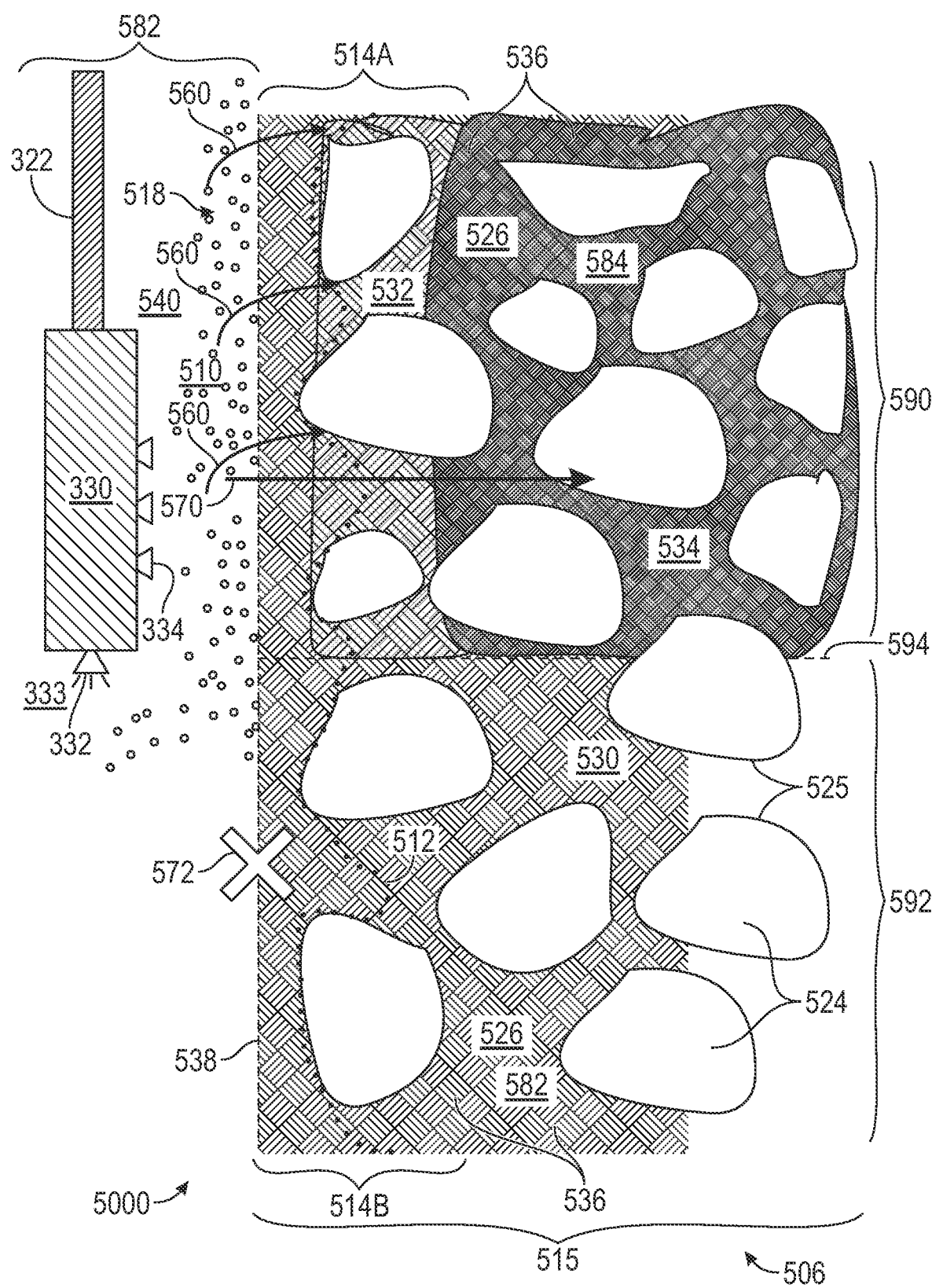

FIG. 3B shows the introduction of the liquid foam treatment into the wellbore. Liquid foam treatment is shown being introduced in a similar manner as provided in FIG. 2B and its accompanying description. As previously described, the liquid foam treatment includes an organic-lean medium (not shown) and nanobubbles 540.

The organic-lean medium mixes with the wellbore fluid 518 as it is introduced and disperses locally. The introduction of the liquid foam treatment may modify the organic concentration of the wellbore fluid locally as it is introduced. The organic-lean medium mixes with the wellbore fluid proximate to the reservoir face. In one or more embodiments, the mixing alters the composition of an organic concentration of the wellbore fluid proximate to the reservoir face. In one or more embodiments, the organic concentration of a particular compound may be increased; in others, the organic concentration of a particular compound may be decreased. Such manipulation may increase or decrease the organic concentration gradient 570 to facilitate diffusiophoresis of the nanobubbles 540 into the reservoir damage 536 of oil-bearing region 590. Such manipulations may facilitate preventing diffusiophoresis into the reservoir damage 536 of water-bearing region 592.

The organic concentration gradient 570 between the organic-lean region 582 in wellbore 510 and the organic-rich region 584 of the near wellbore region (NWR) 515 of reservoir 506, respectively, creates the drive for nanobubbles 540 to be attracted to the external layer 538 of the reservoir damage 536, as described previously. Arrows 560 representing the direction for nanobubble diffusiophoretic migration from the wellbore 510 into the NWR 515 of the reservoir 506 show the drive of the nanobubbles 540 as they migrate from the organic-lean region 542 into the organic-rich region 544.

As previously described in relation to the ion concentration gradient 140, the nanobubbles 540 upon introduction into the wellbore fluid 518 tend to migrate in a generally uphole direction due to buoyancy; however, due to their size their migration uphole is very gradual. Due to the organic concentration gradient 570, the same nanobubbles 540 are drawn to the reservoir face 514 at a greater rate than the buoyancy migration upwards. The nanobubbles 540 will move "upgradient" as previously described.

In one or more embodiments, the nanobubbles may migrate at a diffusiophoretic velocity in a range of from about 0.1 to about 10 micrometers per second (μm/s).

Figure 3C:
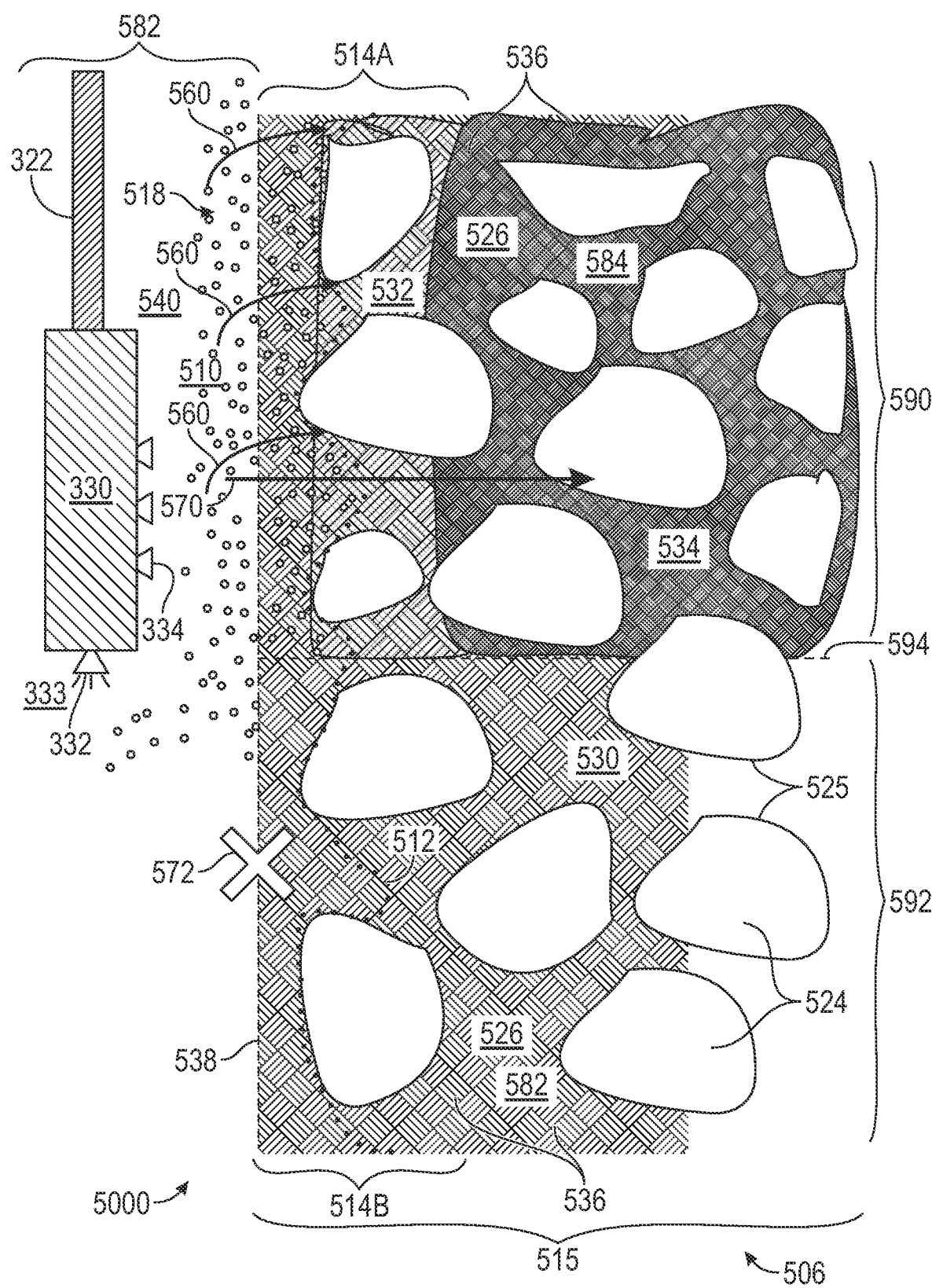

FIG. 3C shows the diffusiophoresis of the nanobubbles into a portion of the reservoir face. The concentration of nanobubbles 540 in the reservoir damage 536 in the oil-bearing region 590 of the NWR 515 of the reservoir 506 is shown as increased over FIG. 3B. The concentration of nanobubbles 540 in the reservoir damage 536 in the water-bearing region 592 is virtually non-existent. As the nanobubbles 540 continue to move up the organic concentration gradient 570 using nanobubble diffusiophoretic migration arrows 560, the nanobubbles 540 encounter the densely-packed area of the reservoir damage 536, similar to what occurred in the description of FIG. 2C.

Figure 3D:
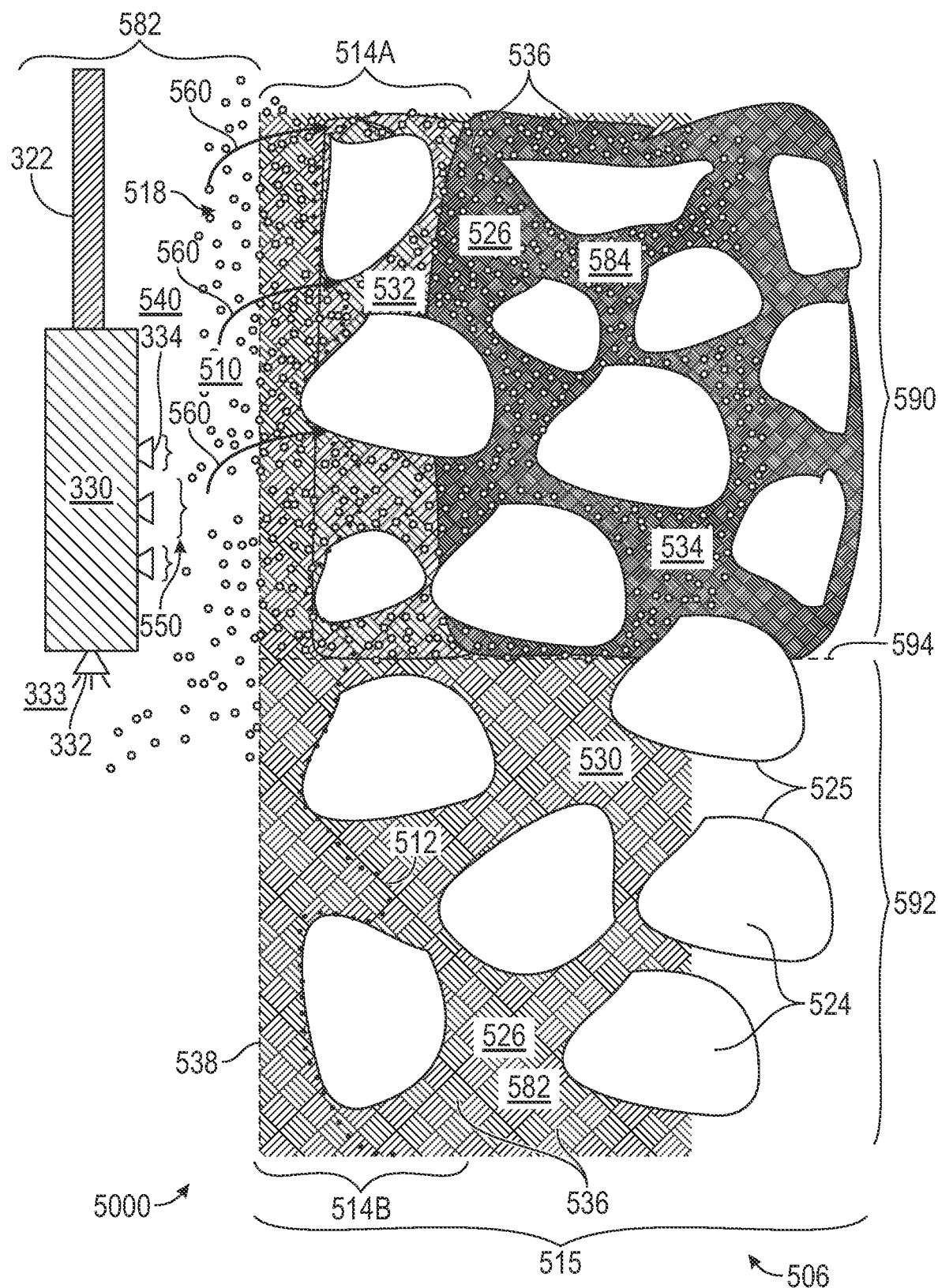

FIG. 3D shows the transmission of an acoustic signal into the wellbore and the reservoir. For the sake of clarity, the organic concentration gradient 570 arrow and no organic concentration gradient 572 "x" have been removed. The several acoustic signal transmitters 334 on downhole tool 330 are shown starting to transmit acoustic waves 550 through wellbore fluid 518. The concentration of nanobubbles 540 in the reservoir damage 536 present in the oil-bearing region 590 of the NWR 515 of reservoir 506 has significantly increased over that shown in FIG. 3C. Similarly, there is little to no nanobubble concentration in the reservoir damage 536 present in the water-bearing region 592 of the NWR 515 of reservoir 506.

FIG. 3D also shows that a liquid foam treatment is still being introduced into the wellbore 510. In one or more embodiments, it may be more useful to continue pumping liquid foam treatment from the surface than to repeatedly turn discharge pumps on and off for several treatments. Any nanobubbles in the wellbore fluid will be burst by the acoustic waves being transmitted.

In one or more embodiments, the acoustic wave transmitted by the acoustic signal transmitter may have a power rating in a range of from about 10 to 1,000 watts (W).

Figure 3E:
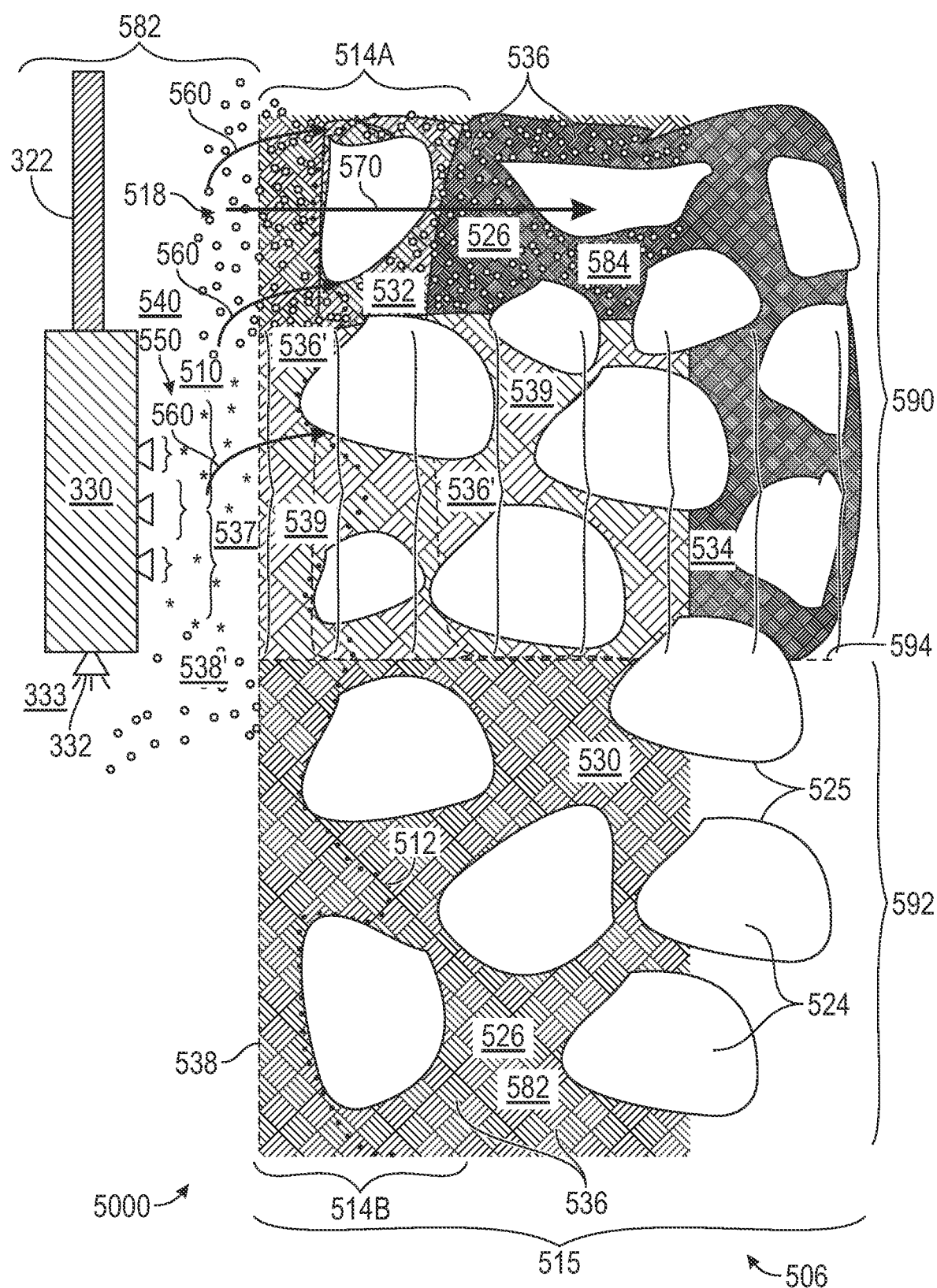

FIG. 3E depicts well system 5000 during continued treatment but after substantially most of the treatment is complete. Similar to the description of FIG. 2E, microjets from the collapsed nanobubbles create new fluid flow pathways through a portion of the damaged section of the near wellbore region and the reservoir face. FIG. 3E shows the remaining NWR 515 of the oil-bearing region 590 of reservoir 506 to be riddled with holes—new flow channels 539 (defined by the remaining reservoir damage 536' and rock grain walls 525 of rock grains 524) that fluidly connect the wellbore 510 with the reservoir 506 through the NWR 515. The contents of the oil-bearing region 590 of reservoir 506 are able to traverse the formed flow channels 539 and the interconnected pores 526. The remaining untreated reservoir damage 536 prevents fluid flow through a portion of the NWR 515 of the oil-bearing region 590; however, the organic concentration gradient 570 is shown being present in this area.

As previously described, debris 537 has been ejected into the wellbore 510, which may be recovered and removed.

In one or more embodiments, the well system may be tailored to selectively treat a near wellbore region of a reservoir, such as the reservoir face, within an oil-bearing region. In one or more embodiments, selective treatment may rely on selective diffusiophoretic migration and subsequent cavitation of nanobubbles into the near wellbore region of a reservoir to be treated. This selective diffusiophoretic migration may reflect the presence of a concentration gradient into region(s) of the reservoir face to be treated.

In one or more embodiments, the well system may be tailored to selectively not treat a particular region of the reservoir face, such as a portion of the near wellbore region with a water-rich region. In one or more embodiments, a lack of diffusiophoretic migration of nanobubbles into a region may be used to minimize the impact of the acoustic waves on the regions not being treated. The lack of selective diffusiophoretic migration may reflect the lack of a concentration gradient into a near wellbore region not to be treated.

As described both with FIGS. 2A-E and FIGS. 3A-E, selective treatment is feasible. Not only is there additional reservoir damage 536 in the oil-bearing region 590 that may be treated to further improve hydrocarbon flow from the oil-bearing region 590 of the reservoir 506, but a damaged section may remain untreated to prevent fluid flow—in this case, formation water in the water-bearing region 592—into the wellbore 510, thereby inhibiting water production.

One or more embodiments utilize a liquid foam treatment that is positioned proximate to the NWR. The liquid foam treatment comprises two phases: nanobubbles (typically the dispersed phase) and a solution (or dispersing) medium (typically the continuous phase). In one or more embodiments, the dominant phase may either be the liquid-dispersing medium or the nanobubbles. In one or more embodiments, the liquid foam treatment may comprise an organic solution to disperse the nanobubbles. In one or more embodiments the liquid foam treatment may comprise an aqueous solution to disperse the nanobubbles. In one or more embodiments, the volume fraction of nanobubbles in the liquid foam treatment composition may be in a range of from greater than 0% to about 70%.

The nanobubbles in one or more embodiments are configured to utilize diffusiophoresis to migrate from an ion-lean medium to an ion-rich medium. The nanobubbles in one or more embodiments are configured to utilize diffusiophoresis to migrate from an organic-lean medium to an organic-rich medium.

The nanobubbles may be filled with one or more gasses. The gas within the nanobubbles may include one or more of methane, natural gas, nitrogen, air, argon, helium, hydrogen, xenon, krypton, radon, carbon dioxide, and combinations thereof.

One or more embodiments may employ a gas in the nanobubbles that remains in a gaseous state at downhole conditions, such as a pressure in a range of from about 1000 to 3000 pounds per square inch (psi) and at a temperature of at least about 100° C. It is preferable that the gas of the nanobubble does not transition to a critical or supercritical state while downhole, which may impact the stability of the nanobubble. In one or more embodiments gases, such as carbon dioxide, may be used. Critical or supercritical CO2 may provide chemical energy as a strong solvent.

In one or more embodiments, nanobubbles may be configured such that they are stable without functionalization or surfactants. Such solvents impart their metastability from their small size and high surface charge density. In one or more embodiments, ionic surfactants, such as SDS (sodium dodecyl sulphate), CTAB (cetyltrimethylammonium bromide), and DTAB (dodecyltrimethylammonium bromide), may be used to form the film of the nanobubbles. In one or more embodiments, non-ionic surfactants, such as the TWEEN series of detergents, such as TWEEN-20 polyoxyethylene (20) sorbitan monolaurate, and TRITON X-100 (octylphenol ethoxylate), may be used to form the film of the nanobubbles. In one or more embodiments, zwitterionic surfactants, such as CBS (cocamidopropyl hydroxysultaine), may be used to form the film of the nanobubbles.

In one or more embodiments, the surface functionalization may be selected based upon the target near wellbore region. Surface functionalization may be provided by common surface modifiers used to add functional groups such as —COOH, —OH, and —C=O. In one or more embodiments, the nanobubble surfactant ionization (exterior surface charge) may be selected based upon the ionic gradients of the target near wellbore region. The selection of the nanobubble surfactant ionization may be made by analyzing formation and injection water samples to determine the concentration of major ions contributing to the diffusiophoretic migration of the nanobubbles.

In one or more embodiments the surfactant polarization (exterior surface charge) may be selected to impact attraction to other polar charges, such as double-bonded heteroatoms and water. Surface polarization may include common surface modifiers that either add dipoles or induce ionic polarization such as zwitterionic surfactants. In one or more embodiments, the nanobubble surfactant polarization may be selected based upon the target new wellbore region.

In one or more embodiments, the nanobubbles may have an average radius in a range of from about 1 nanometer (nm) to 10 micrometers (μm). The term "nanobubbles" is used collectively for the entire potential bubble diameter range unless a specific range is provided. The diameter may affect the migration of nanobubbles through the target region or regions. In one or more embodiments, the nanobubble diameter is selected based upon the target near wellbore region. The nanobubble diameter is selected from conventional formation evaluation techniques and petrophysical data collected during drilling.

In one or more embodiments, the volume fraction of the nanobubbles in the liquid foam treatment may be in a range of from about 0.1 to 40% by volume, such as in a range of from about 0.1 to 30% by volume, such as in a range of from about 0.1 to 20% by volume, such as in a range of from about 0.1 to 10% by volume. Such a volume fraction may provide a viscosity of the liquid foam treatment that is sufficient to maintain the shape of the nanobubble suspension when static and allow the viscosity to decrease upon shearing (when pumped) to permit transport, such as by pumping, downhole.

In one or more embodiments, the fluid density range of the liquid foam treatment may be selected based upon the target near wellbore region by sampling the downhole liquids. The density of the liquid foam treatment may be manipulated by modifying the volume fraction of nanobubbles to the volume fraction of the dispersing medium. In one or more embodiments, the density may be similar to the dispersing medium. The density of the liquid foam treatment may be the same density within +1-5% compared to the fluid in the NWR.

In one or more embodiments, the fluid viscosity range of the liquid foam treatment may be similar to freshwater or saline water. The viscosity of the liquid foam treatment may be the same viscosity within +1-5% compared to the formation water. In one or more embodiments, the liquid foam treatment viscosity may be selected based upon the target near wellbore region. In one or more embodiments, a viscofier, such as an enhanced oil recovery polymer such as AN-125 or AN-132 polymer from manufacturer SNF, may be added to the liquid foam treatment to modify its viscosity.

The solution medium of the liquid foam treatment comprises water and either an ion-providing material or an organic-providing material, and optionally other dissolved materials, such as, but not limited to, surfactants, functionalization agents, and solvents. Other materials to support the diffusiophoresis process for the nanobubbles into the NWR are accepted and contemplated. In one or more embodiments, the wellbore organic gradient may be generated by fatty acids that leach out of the hydrocarbons. In one or more embodiments, the ionic gradient may be generated by ions that leach out of the formation water and may include, but are not limited to, barium ($Ba^{2+}$), bicarbonate ($HCO_3^-$), boron ($B^{3+}$), bromide ($Br^-$), calcium ($Ca^{2+}$), chloride ($Cl^-$), iodide ($I^-$), lithium ($Li^+$), magnesium ($Mg^{2+}$), potassium ($K^+$), sodium ($Na^+$), strontium ($Sr^{2+}$), sulfate ($SO_4^{2-}$), and combinations thereof.

In one or more embodiments, the solution medium of the liquid foam treatment comprises water. Water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; boiler feed water; condensate water; and combinations thereof. The water may include impurities, including, but not limited to, ions, salts, minerals, polymers, organic chemicals, inorganic chemicals, detritus, flotsam, debris, and dead and living biological life forms so long as the purpose and performance of the solution medium is not mitigated or otherwise detrimentally affected.

In one or more embodiments, the solution medium may include one or more ionic solute. Ionic solutes within the solution medium may be present as ions. One or more ions may constitute the concentration gradient present between the ion-lean medium and the ion-rich medium in one or more embodiments. Examples of the ions that may be found in the solution medium of the liquid foam treatment may include, but are not limited to, barium ($Ba^{2+}$), bicarbonate ($HCO_3^-$), boron ($B^{3+}$), bromide ($Br^-$), calcium ($Ca^{2+}$), chloride ($Cl^-$), iodide ($I^-$), lithium ($Li^+$), magnesium ($Mg^{2+}$), potassium ($K^+$), sodium ($Na^+$), strontium ($Sr^{2+}$), sulfate ($SO_4^{2-}$), and combinations thereof.

An ion-providing material may be introduced to the solution medium to alter the concentration of one or more ions in the liquid foam treatment. The ion-providing material may have any physical form, including solid, liquid, gas, or solution (in water or another solvent) before addition. Examples of an ion-providing material may include, but are not limited to, barium hydroxide (BaOH), calcium chloride ($CaCl_2$), lithium chloride (LiCl), magnesium sulfate ($MgSO_2$), potassium bromide (KBr), potassium iodide (KI), sodium bicarbonate ($NaHCO_3$), sodium chloride (NaCl), and combinations thereof.

In one or more embodiments, the solution medium may include one or more organic-providing materials. An organic-providing material within the liquid foam treatment may be present as dissolved molecules. Compounds, such as fatty acids, may leach out of the oil phase and gradually form a continuous organic concentration gradient in the continuous phase. Other species may be present in the brine or liquid hydrocarbons in the reservoir than in the wellbore fluid and may be used to form an organic chemical gradient, such as organic sulfur compounds, highly polar hydrocarbons, oxygenated hydrocarbon compounds, such as phenol, and organometallics.

An organic-providing material within the solution medium may be present as dissolved molecules. An organic-providing material may be added to the solution medium to alter the concentration of one or more organic-providing materials in the solution medium and in the liquid foam treatment. An organic-providing material may have any physical form, including solid, liquid, gas, or solution (in water or another solvent) before addition to the ion-lean medium.

Optionally, one or more surfactant may be used as part of the solution medium of the liquid foam treatment to stabilize the nanobubbles. Examples of a useful surfactant include, but are not limited to, sodium dodecyl sulfate (SDS), a linear alkylbenzene sulfonate (LAS), a fatty alcohol ether sulfate, and combinations thereof. In one or more embodiments, surfactants may also be used as the organic-providing material, such as surfactants used to treat the formation. Specifically, surfactant(s) may induce various kinds of repulsive interaction between nanobubbles to prevent coalescence of adjacent bubbles, which maintains the small size of the nanobubbles. Additionally, surfactant(s) may inhibit the gas dissolution into the solution medium, which increases the longevity of nanobubbles.

For one or more embodiments, the solution medium of the liquid foam treatment comprises a surfactant. In one or more embodiments, the surfactant includes an anionic surfactant such as SDS (sodium dodeclysulphate.) In one or more embodiments, the surfactant includes a cationic surfactant, such as CTAB (cetyl trimethyl ammonium bromide). In one or more embodiments, the surfactant includes a non-ionic surfactant, such as the TWEEN series detergents, such as TWEEN-20 and TWEEN-80. In one or more embodiments, the surfactant includes an amphoteric or zwitterionic surfactant, such as CBS (cocamidopropyl hydroxysultaine).

In one or more embodiments, a concentration of the surfactant(s) in the solution medium may be in a range of from 1 μM (micromolar) to 1 mM (millimolar).

In one or more embodiments, the liquid foam treatment may include a solvent to form a concentration gradient to induce diffusiophoretic migration of nanobubbles. Examples of a useful solvent include, but are not limited to, carbon dioxide and short or long chain alcohols, such as ethanol and decanol.

In one or more embodiments, the existing wellbore fluid may serve as part of the ion-lean medium or organic-lean medium. The wellbore fluid may naturally serve as an ion-lean region or organic-lean region due to differences in composition with the reservoir fluids; however, some properties may be enhanced or may be diminished by mixing with the solution medium. A useful specie may be detected in the wellbore fluid, and the concentration of the ion gradient or the organic gradient may be modified by introducing a useful material or solution.

As an illustrative example, nanobubbles may be formed within the existing wellbore fluid, such as by drawing wellbore fluid into the solution generation tool before forming the nanobubbles, by sparging nanobubbles into the wellbore fluid within the wellbore, or by reactively forming the nanobubbles within the wellbore fluid.

Figure 4:
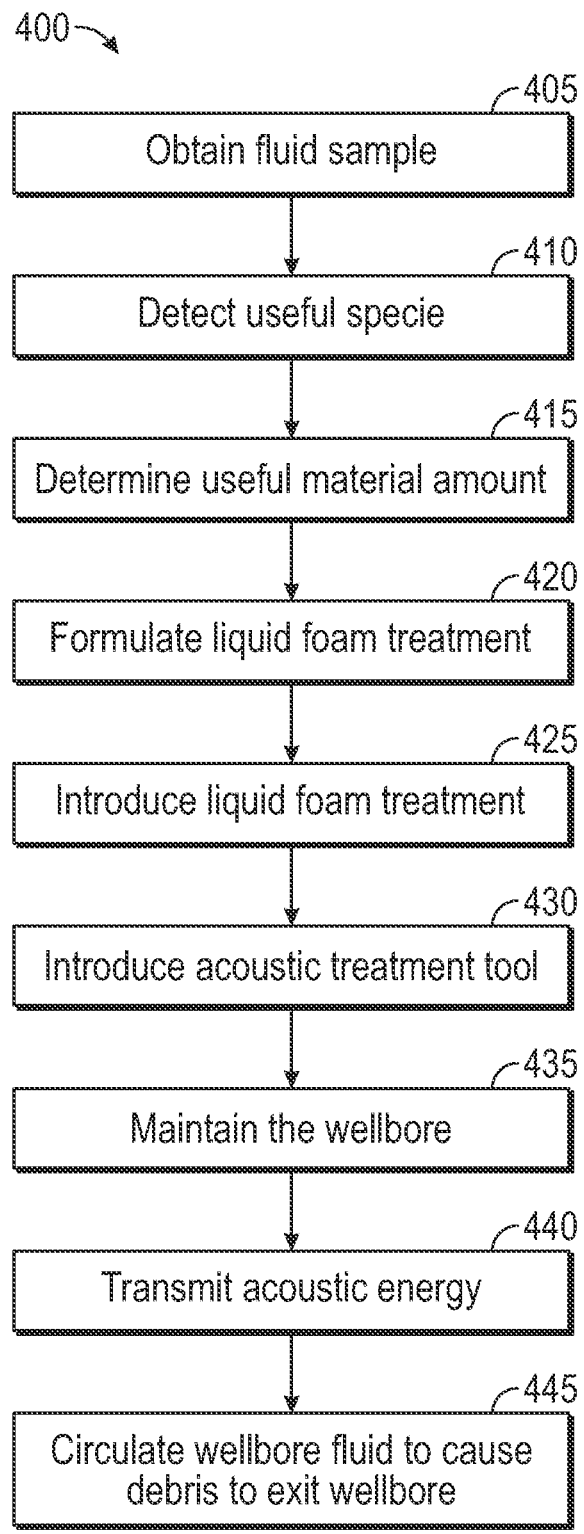
FIG. 4 is a flowchart depicting a method for treating a well system according to one or more embodiments.

FIG. 4 is a flowchart depicting a method for treating a well system according to one or more embodiments. Method 400 includes obtaining a fluid sample from the reservoir to be treated 405. A fluid sample may be obtained and delivered to the surface for analysis using any technique known in the industry.

Method 400 includes detecting a useful specie for forming a concentration gradient 410. In one or more embodiments, the useful specie may be an ionic material. In one or more embodiments, the useful specie may be an organic material. In one or more embodiments, the ionic material is a disassociated ion from an ion-providing material, such as a salt, previously introduced into the near wellbore region of the reservoir, such as through a prior treatment. In one or more embodiments, the organic material is an organic providing material, such as a surfactant, previously introduced into the near wellbore region of the reservoir.

In one or more embodiments, the useful specie may be detected in the wellbore fluid. In one or more embodiments, the useful specie may be detected in the fluid in the near wellbore region.

Method 400 includes determining an amount of a useful material to include in a liquid foam treatment to form the concentration gradient across the near wellbore region of the reservoir 415. In one or more embodiments, the useful material may be an ion-providing material. The useful compound may be an organic providing material. The useful material in some instances is associated with the useful specie, for example, a weak conjugate base to a strong acid, or a larger organic compound that thermally-decomposes into one or more smaller organic compounds.

Determining the amount of a useful material may be related to the composition of the wellbore fluid. If the wellbore fluid contains some amount of the ion-providing material or the organic-providing material already, then not as much of the ion-providing or organic-providing material may need to be introduced with the liquid foam treatment to increase the total concentration in the wellbore to form the concentration gradient. Also, the dilution effect of introducing the liquid foam treatment into the wellbore fluid may also be accounted such that an adequate ion-lean or organic-lean concentration is present in the wellbore.

Determining the amount of a useful material may also be related to the composition of the fluid in the near wellbore region for similar reasons as given for the wellbore fluid.

Method 400 includes formulating the liquid foam treatment 420. The liquid foam treatment may include water, nanobubbles, either an ion-providing material or an organic-providing material, and optionally surfactants, functionalization materials, solvents, and combinations thereof. In one or more embodiments, the liquid foam treatment includes an ion-providing material. In one or more embodiments, the liquid foam treatment includes an organic-providing material.

The formulation step may also include the process of forming the nanobubbles. In one or more embodiments, the nanobubbles are formed at the surface and are pumped downhole as part of a foam, such as with the liquid foam treatment. In one or more embodiments, the nanobubbles are formed in situ using a downhole device for forming nanobubbles from the wellbore fluid supplemented with a foaming material.

Method 400 includes introducing the liquid foam treatment into the wellbore such that it is positioned proximate to the reservoir face of the near wellbore region to be treated 425. In one or more embodiments, the liquid foam treatment is introduced through the acoustic treatment tool. In one or more embodiments, the liquid foam treatment is introduced through a fluid conduit, such as a drill string or coiled tubing. In one or more embodiments, the liquid foam treatment is introduced from the surface through circulation of the wellbore fluid. Other means of introduction are appreciated.

Method 400 includes introducing an acoustic treatment tool into the wellbore such that its acoustic transmitters are directed towards the reservoir face of the near wellbore region to be treated 430.

Method 400 includes maintaining the wellbore such that the nanobubbles migrate into the near wellbore region of the reservoir to be treated 435. The nanobubbles migrate through the wellbore fluid and the fluid in the near wellbore region using diffusiophoresis, as previously described. The introduction of the liquid foam treatment not only introduces the nanobubbles but also creates the concentration gradient (ion or organic-based) that encourages the nanobubbles to migrate from the wellbore fluid, through the reservoir face, and into the near wellbore region of the reservoir.

Maintaining the wellbore does not mean that no activity is occurring. Tools and pipe may traverse the wellbore. Wellbore fluid may be circulated; its composition may be changed. Regardless of the other activities, the migration of nanobubbles from where they are introduced into the wellbore and migrate into the near wellbore region is not hindered and progresses in a timely manner.

Maintaining the wellbore may also include establishment of a concentration gradient. Upon introduction of the liquid foam treatment fluid, it may take a period for the liquid foam treatment fluid to diffuse and form a gradient-inducing material across the wellbore and the near wellbore region.

At the end of the maintenance period, method 400 includes transmitting acoustic energy into the near wellbore region of the reservoir 440. The transmission of the acoustic waves towards the reservoir face and into the near wellbore region causes cavitation and collapse of the nanobubbles both in the wellbore proximate to the reservoir face and within the near wellbore region. As previously described, such energetic collapse forms microjets of fluids that disrupt and destroy the consolidation of material. Some of the material is ejected out into the wellbore as debris, as previously described, removing it from the near wellbore region and providing fluid access between the wellbore and the reservoir.

In one or more embodiments, the wellbore fluid may be circulated to cause the debris freed by the treatment to exit the wellbore 445. Such fine material may be collected using a mud circulation system that is commonly known in the industry.

In one or more embodiments, only a portion of the damaged near wellbore region (NWR) (damaged NWR) of the reservoir may be treated. In such embodiments, the acoustic treatment tool may be repositioned such that it is adjacent to a second portion of the near wellbore region that has been partially or completely inundated with nanobubbles to be similarly treated. The method may be in part or in full repeated as often as necessary to complete the desired level of treatment of the reservoir.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and variations thereof means that the subsequently described event or circumstances may or may not occur. The description includes instances where the event or circumstance occurs and instances where it does not occur.

When the word "approximately" or "about" and variations thereof are used, this term may mean that there can be a variance in value of up to ±10%, of up to 5%, of up to 2%, of up to 1%, of up to 0.5%, of up to 0.1%, or up to 0.01%.

The term "substantially" and variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed:

1. A method for treating a reservoir with a damaged near wellbore region (NWR), the method comprising:
    introducing a liquid foam treatment into a wellbore proximate to the damaged NWR, where the liquid foam treatment comprises a solution medium and nanobubbles, where the nanobubbles are configured to migrate from a lean medium in the wellbore to a rich medium in the NWR using a concentration gradient, and where the introduction of the liquid foam treatment into the wellbore promotes formation of the concentration gradient;
    maintaining the wellbore such that at least a portion of the nanobubbles migrate into the damaged NWR from the wellbore; and
    transmitting an acoustic wave towards the damaged NWR such that the nanobubbles affected by the transmission in the wellbore and in the damaged NWR collapse, causing fluid flow pathways to form through the damaged NWR, where the formed fluid flow pathways provide fluid connectivity between the wellbore and the reservoir sufficient for hydrocarbon production.

2. The method of claim 1, further comprising:
    obtaining a sample of a fluid from the damaged NWR
    detecting the presence of a useful specie for forming the concentration gradient between the wellbore and the NWR; and
    determining an adequate amount of the useful material to include in the solution medium of the liquid foam treatment to form the concentration gradient upon introduction of the liquid foam treatment into the wellbore.

3. The method of claim 2, where the useful material is an ion-providing material.

4. The method of claim 2, where the useful material is an organic-providing material.

5. The method of claim 1, where the solution medium comprises water and at least one of an ion-providing material and an organic-providing material, and optionally a surfactant, a solvent, and a functionalization material.

6. The method of claim 5 where the surfactant is selected from the group consisting of sodium dodecyl sulfate (SDS), a linear alkylbenzene sulfonate (LAS), a fatty alcohol ether sulfate, and combinations thereof.

7. The method of claim 5, where the solvent may comprise carbon dioxide, short chain alcohols, long chain alcohols, ethanol, decanol, and combinations thereof.

8. The method of claim 1, where the nanobubbles comprise a gas and have a diameter in a range of from about 1 nanometer (nm) to 10 micrometers (µm).

9. The method of claim 8, where the gas of the nanobubbles is selected from the group consisting of methane, natural gas, nitrogen, air, argon, helium, hydrogen, xenon, krypton, radon, carbon dioxide, and combinations thereof.

10. The method of claim 1, where the acoustic wave travel in a range of from about 1 mm (millimeter) to about 10 meters into the reservoir.

\* \* \* \* \*